United States Patent Office

3,589,933
Patented June 29, 1971

3,589,933
SUSPENSION SYSTEMS FOR VEHICLES
Robert Hazell Pitcher, Leamington Spa, England, assignor to Automotive Products Company Limited, Leamington Spa, England
Filed Aug. 5, 1968, Ser. No. 757,187
Claims priority, application Great Britain, Aug. 16, 1967, 37,582/67
Int. Cl. B60g 21/06
U.S. Cl. 280—112                     4 Claims

ABSTRACT OF THE DISCLOSURE

Control means for controlling a vehicle suspension system so as to maintain the vehicle body at a substantially constant mean height despite load variations and to oppose tilting due to horizontal forces in at least one direction (roll or pitch) in which a plurality of fluid-containing struts supporting the body have their fluid content controlled by control units each comprising a spool valve capable of connecting the appropriate strut to a source of fluid pressure or a drain and a valve control linkage operated by wheel displacement relative to the vehicle body, the linkage including a first component movable by relative wheel-to-body movement, a second component coupled to the valve spool and a weight suspended from the first component and connected below its suspension pivot to the second component.

---

This invention relates to suspension systems for vehicles, and has for its general object to provide a control unit which serves to maintain a vehicle body at, or substantially at, a constant height above the ground under changing load conditions and which may further control the body attitude with regard to pitch and roll whilst the vehicle is in motion.

The control unit according to the invention is for use in suspension systems for vehicles in which one or more of a plurality of wheels each has that part of the weight of the vehicle which it supports transmitted to it through a liquid filled strut of variable length, the volume of the liquid in the strut, and therefore its length, being variable by the operation of a control valve which is responsive to progressive wheel-to-body positional changes as well as to horizontal forces, and in particular centrifugal forces such as experienced during cornering. In some embodiments of the invention the control valve is responsive also to rapid wheel-to-body positional changes as caused for example, by the passing of the wheel over a protrusion or hollow in the ground. Furthermore, by the suitable positioning of the control valve relative to the longitudinal axis of the vehicle it may be made responsive additionally to the horizontal forces acting longitudinally of the vehicle as experienced for example, during acceleration and braking.

The control unit of the invention although particularly for use with suspension systems in which the struts are liquid filled, may however, be used with systems in which the struts are filled with a gaseous fluid, such as compressed air.

According to the invention there is provided a control unit for controlling the fluid content of a fluid-containing strut of variable length arranged in series with resilient means between a body member of a vehicle and a wheel thereof so as to enable the said body member and hence the body attitude to be constantly controlled with respect to the supporting surface with which the wheels engage, said control unit comprising a valve including a valve member movable in opposite directions to connect the strut respectively to a source of fluid pressure or a drain, a linkage operated by wheel displacement relative to the vehicle body, said linkage including a first component movable by relative wheel-to-body movement, a second component coupled to the valve spool, and a weight pivotally suspended from said first component and also connected at a point which is lower than its suspension pivot to said second component, the weight tending to maintain a constant position relative to the first component and therefore to cause the second component to follow the movements of the first component, but being moveable about its suspension point, to move the second component relative to the first component and actuate the valve in a direction to vary the fluid content of the strut to control the vehicle body attitude.

In operation, the linkage is actuated by a wheel displacement relative to the vehicle body to move the valve member to connect the strut to the pressure source when the wheel and the vehicle body move progressively towards each other and to connect the strut to the drain when the wheel and the vehicle body move progressively away from each other.

In the preferred embodiments of the invention the weight is movable about its suspension pivot in accordance with horizontal forces, such as centrifugal forces due to cornering of the vehicle.

Also in the event of rapid vertical accelerations of a wheel towards or away from the vehicle body, the first component of the linkage and the suspension pivot will be subjected to similar rapid accelerations causing the weight to rotate partially about its centre of mass. In some preferred embodiments of the invention the connection of the second component with the weight is located at a point lower than the centre of mass so that the rapid accelerations of the wheel towards the vehicle body are arranged to move the valve to connect the strut to the drain, and conversely so that the rapid accelerations of the wheel away from the vehicle body move the valve to connect the strut to the source of pressure fluid. Alternatively, in another embodiment of the invention the connection of the second component to the weight is arranged so that the second component and thereby the valve is not affected by the rapid accelerations of the wheel relative to the vehicle body by making the connection for the second component coincident with the centre of mass of the weight.

The invention will now be described with reference to the accompanying drawings in which.

Figure 1:
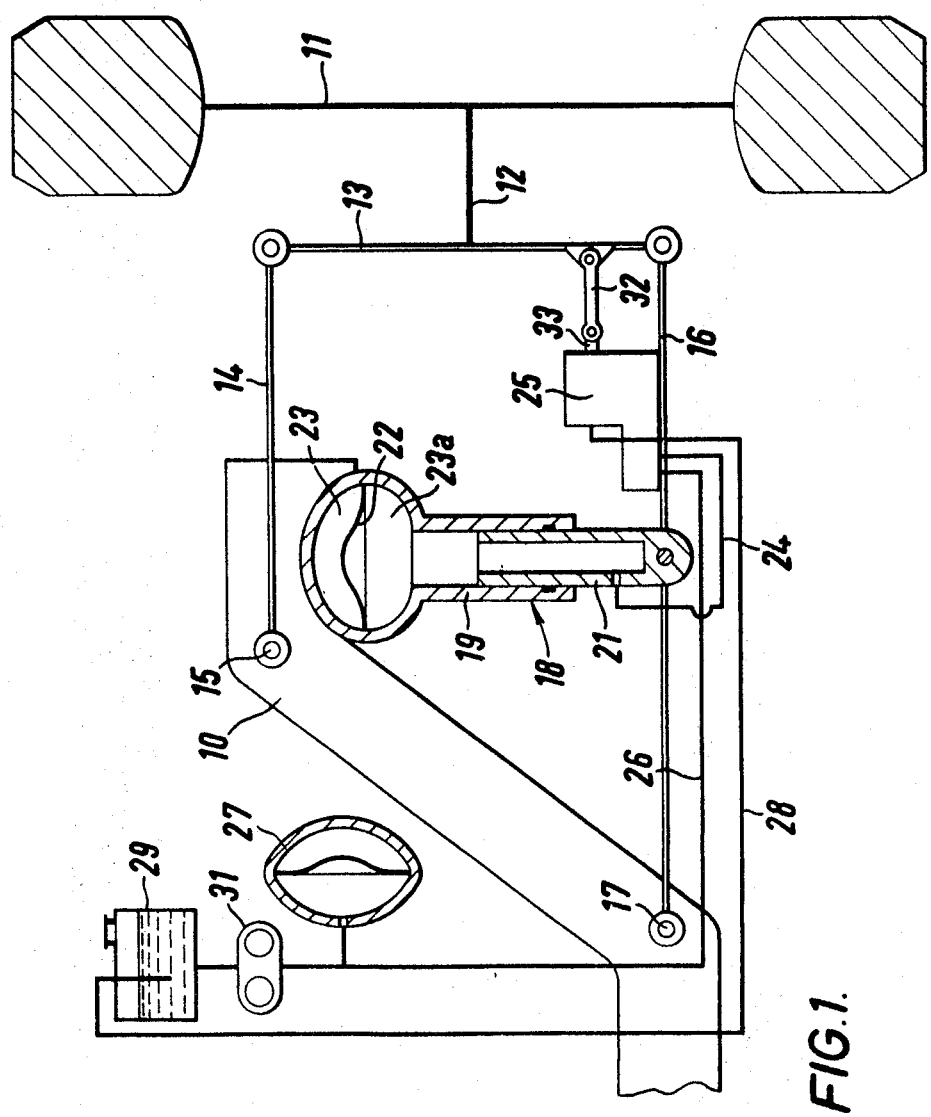
FIG. 1 is a diagrammatic front view of one form of suspension system embodying the invention, showing part of a vehicle structure, a wheel, and the components of the wheel suspension assembly.

Referring to FIG. 1 of the drawings, a part of a front axle of a vehicle is shown at 10, and a wheel 11 is mounted on a stub axle 12 carried by a suspension assembly comprising a wheel supporting member 13, an upper pivoted link 14 pivotally attached to the upper end of the member 13 and pivoted on the front axle 10 at 15, and a lower pivoted link 16 pivotally attached to the lower end of the member 13 and pivoted to the front axle 10 at 17. At least one of the links 14 and 16 may be of the wishbone type. A strut 18, telescopic to enable its length to be varied has its upper cylinder portion 19 attached to the front axle 10 and its lower hollow plunger portion 21 attached to the lower pivoted link 16 intermediate the ends of the latter. The cylinder portion 19 of the strut 18 is divided by a flexible diaphragm 22 or equivalent movable wall into an upper chamber 23 filled with a compressed gas and a lower chamber 23a. The lower chamber 23a, together with the hollow plunger portion, is filled with liquid. It will be understood that that the strut, instead of including a compressed gas chamber, may be connected to the vehicle body by a compression spring.

The liquid chamber in the strut is connected by a conduit 24 to a valve, hereinafter described, mounted in a control unit 25 which is mounted in the lower link 16, the valve being arranged to connect the said liquid chamber either through a conduit 26 to a liquid pressure accumulator 27 or through a drain conduit 28 to a low pressure liquid reservoir 29. A pump 31 driven by the engine of the vehicle, draws liquid from the reservoir 29 to maintain a predetermined pressure in the accumulator 27, a cut-out valve (not shown) being provided in the customary manner to enable the pump 31 to circulate liquid idly back to the reservoir when a predetermined pressure is attained in the accumulator 27.

The control unit 25 is actuated, as will be hereinafter described by a link 32 pivoted at one end to the wheel carrier 13 and at the other end to a slidable component 33 in the control unit, movable in a direction transverse to the longitudinal axis of the vehicle so that the said slidable component 33 is moved rectilinearly by relative vertical movement of the wheel 11 and the axle 10, the latter being rigid with the vehicle body so as to partake of the movements thereof.

Figure 2:
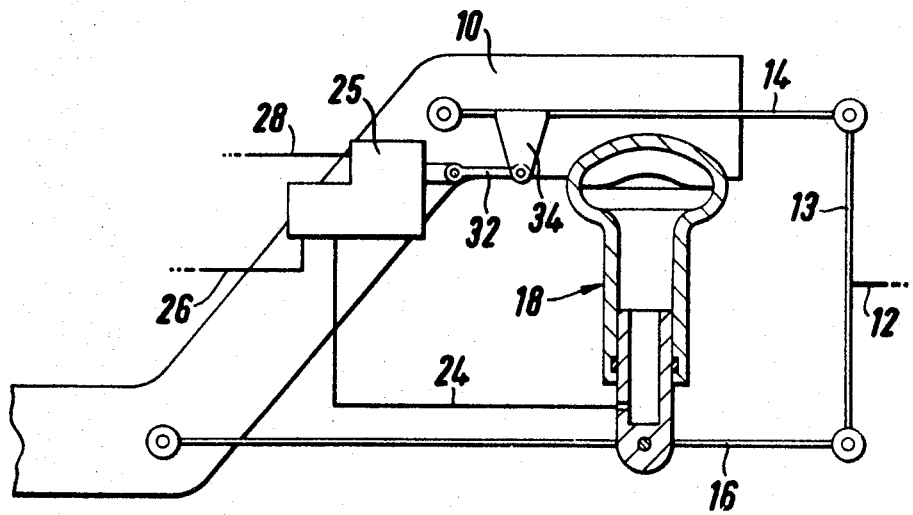
FIG. 2 is a view similar to FIG. 1 but excluding some of the parts shown in FIG. 1, and showing a different position of the control unit.

FIG. 2 shows a suspension assembly similar to that shown in FIG. 1, but in which the control unit 25 is rigidly mounted on the front axle 10, and the link 32 is pivoted to an arm 34 rigid with and depending from the upper link 14 of the suspension assembly.

Figure 3:
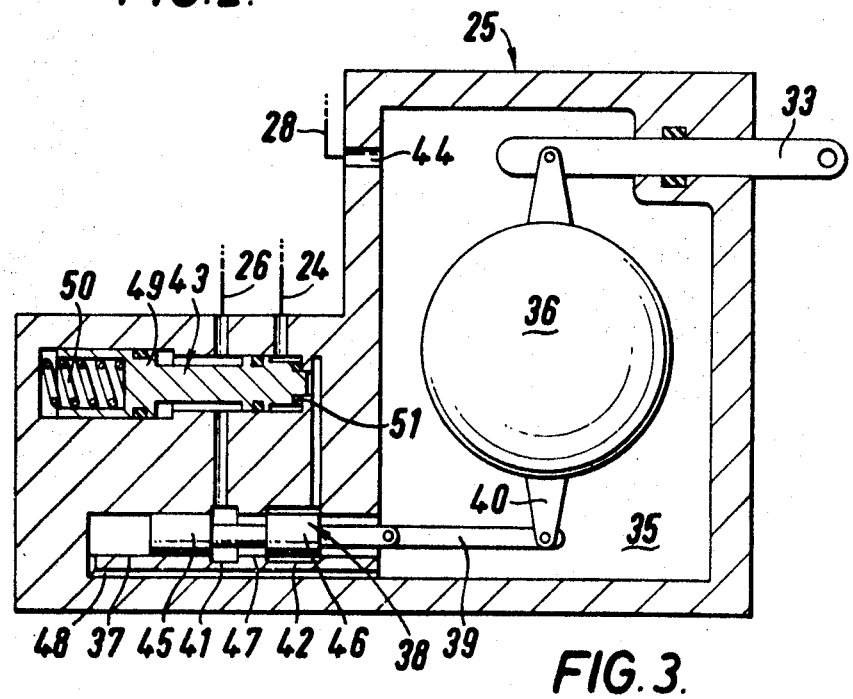
FIG. 3 is a sectional elevation of one form of control unit.

Referring now to FIG. 3 of the drawings, the control unit 25 comprises a body in which is formed a chamber 35. The slidable component 33 moved by relative vertical movement of the wheel and body extends into the chamber 35 adjacent the top of the latter, and moves in a substantially horizontal direction. A weight 36 is pivotally suspended on the component 33 about a pivot axis parallel to the longitudinal axis of the vehicle, so that under the action of gravity it tends always to assume a predetermined position in which its centre of mass is vertically below the point of suspension. A substantially horizontal valve bore 37 opens into the chamber 35 adjacent the bottom thereof, and a valve spool 38 slidable in the said valve bore 37 is connected by a pivoted link 39 to a downward projection 40 on the weight 36. The slidable component 33, link 39 and weight 36 thus form a linkage connecting a member of the vehicle suspension system to the valve spool 38. Since the weight 36 tends always to follow the movements of the component 33 of the linkage, the valve spool tends always to assume a predetermined position relative to the said component 33.

The valve bore 37 is formed with two axially spaced circumferential grooves 41 and 42, the groove 41 being in constant communication through the conduit 26 with the liquid pressure accumulaor, and the groove 42 being connected, through a pressure maintenance valve 43 hereinafter described, by way of the conduit 24, to the liquid chamber of the strut 18. The chamber 35, into which the valve bore opens, is connected to the drain conduit 28 at 44.

The valve spool 38 is formed with two lands 45 and 46 separated by a groove 47, the land 46 being of a length such that, in one position of the spool, it just covers the groove 42. The groove 41 in the valve bore is in constant communication with the groove 47 in the valve spool 38, and outward movement of the valve spool from the said one position towards the chamber 35 thus connects the strut to the accumulator, whilst inward movement connects it through the chamber 35 to the low pressure reservoir. The end of the valve bore 37 remote from the chamber 35 is connected to the said chamber through a passage 48 so that the valve spool is in pressure balance at all times.

It is evident that, unless the valve spool 38 is in the position in which the land 46 covers the groove 42, liquid will be supplied to or released from the strut. Since this position of the valve spool corresponds to a particular position of the component 33, which in turn corresponds to a particular relative vertical position of the wheel and vehicle body, the vehicle body will always tend towards that particular position relative to the wheel.

The pressure maintenance valve 43 is provided to avoid loss of liquid from the strut 18 when the vehicle is standing for prolonged periods.

It is well known to persons concerned with the design and manufacture of fluid pressure systems that spool valves are not absolutely fluid-tight due to the fact that the spool must be a sliding fit in the valve bore. To overcome this disadvantage, the pressure maintenance valve 43 is interposed between the strut 18 and the valve bore groove 42 to which it is connected, the said valve 43 comprising a plunger 49 urged by a spring 50 to a position in which a resilient seal 51 at one end thereof closes off the connection between the strut and the spool valve. The plunger 49 is subjected, when the pump is running, to a pressure moving it against the spring 50 to open the said connection. Thus, when the pump is not running, the connection between the strut and the spool valve is closed, the pressure maintenance valve being of a type providing a positive closure of the passage through it.

Assuming that each wheel of the vehicle has associated with it a separate strut 18 and control unit 25, it will be readily seen that an increase in the static load on the vehicle will tend to compress the gas in the chambers 23 of the struts 18 and move the vehicle body downwardly. The sliding components 33 of the linkages in the control units 25 will, assuming the said units to be mounted as shown in FIGS. 1 and 2, move outwardly of the chambers 35, the weights 36 will move with them and the valve spools 38 to connect the struts 18 to the liquid pressure accumulator 27. Liquid will therefore be forced into the struts 18 until the vehicle returns to the previous level. Conversely, if, due to reduction in the static load, the gas in the chambers 23 is allowed to expand and raise the vehicle body, the sliding components 33 will move inwardly and the valve spools 38 will move to connect the struts 18 to the low pressure reservoir 29 so the vehicle body will move downwardly to the previous level.

Owing to the orientation of their pivot axes, the suspended weights 36 are not displaced relative to the sliding components 33 by acceleration or deceleration of the vehicle, but any dip of the front end of the vehicle due to heavy braking, or lift of either end of the vehicle due to rapid acceleration will be transmitted to the control units of the appropriate suspension assemblies which will actuate the valves to cause the struts to counteract the dip or lift.

The control unit of the present invention also provides for correction of "body roll" experienced during cornering and caused by centrifugal force acting on the vehicle body. The centrifugal force causes the body to tend to move downwardly relative to the wheels on the major radius of the bend and upwardly relative to the wheels on the minor radius of the bend, or, in other words, increases the effective load ont he wheels on the major radius and reduces the effective load on the wheels on the minor radius. The centrifugal force will also act on the suspended weights 36 to cause them to swing towards the major radius of the bend. The control units 25 are so mounted that swinging of the weights 36 towards the longitudinal centre line of the vehicle connects the associated struts to the low pressure reservoir, and swinging of the weights away from the longitudinal centre line of the vehicle connects the associated struts to the accumulator.

The movement of the slidable components 33 due to a tendency of the vehicle body to roll produces a similar effect to their movement under a change of static load, but the swinging of the weights due to centrifugal force produces an added correction factor tending to cause the vehicle body to tilt slightly in the opposite direction.

It will be observed that, if a wheel moves upwardly with respect to the vehicle body, the length of the associated strut tends to be increased, the reverse action taking place if the wheel moves downwardly. Whilst this mode of operation is ideal for dealing with static weight changes, it is highly unsatisfactory for dealing with wheel movements due to the said wheel passing over protrusions or hollows in the rod surface, since it would exaggerate the vehicle body movement as the wheel passed over the protrusions and hollows. However, the effect of the passage of the wheel over such protrusions and hollows is to produce rapid acceleration of the wheel in an upward or downward direction, producing rapid acceleration of the sliding component 33 in one direction or the other. Under such conditions, the inertia of the suspended weight tends to hold its centre of mass substantially stationary, with the result that it rotates about its centre of mass and moves the valve spool 38 in the opposite direction to the sliding component 33. Consequently a rapid upward wheel movement actuates the valve in a direction to shorten the strut and a rapid downward movement of the wheel actuates the valve in a direction to lengthen the strut, and the control unit therefore causes the strut to vary its length in the appropriate direction to provide a substantially level ride.

Figure 4:
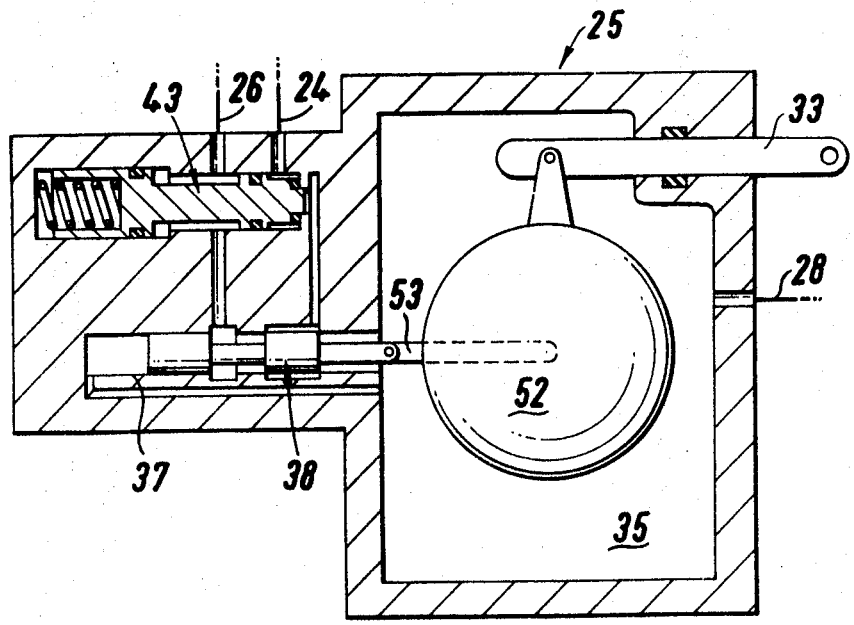
FIG. 4 is a sectional elevation of another form of control unit.

FIG. 4 shows a modified form of control unit 25 in which a weight 52, similar to the weight 36 shown in FIG. 4 but without the downward projection 40, is similarly suspended on the sliding component 33 in the chamber 35 of the control unit, but the valve bore 37 is arranged in a horizontal plane passing substantially through the centre of mass of the weight, and a link 53 connecting the weight to the valve spool 38 is pivoted to the weight at the centre of mass of the latter. The valve corresponds in all respects to that shown in FIG. 3, and a pressure maintenance valve 43 is provided as in FIG. 3.

In the arangement of FIG. 4, the weight acts in the same manner as does the weight in FIG. 3 to maintain the height of the vehicle constant with varying static load, to maintain a fore-and-aft level position under acceleration and braking conditions, and to counteract body roll.

However, due to the fact that the weight is connected at its centre of mass to the valve spool, and therefore rotates about that point of connection with wheel movements caused by road irregularities, this arrangement does not compensate for such irregularities.

Figure 5:
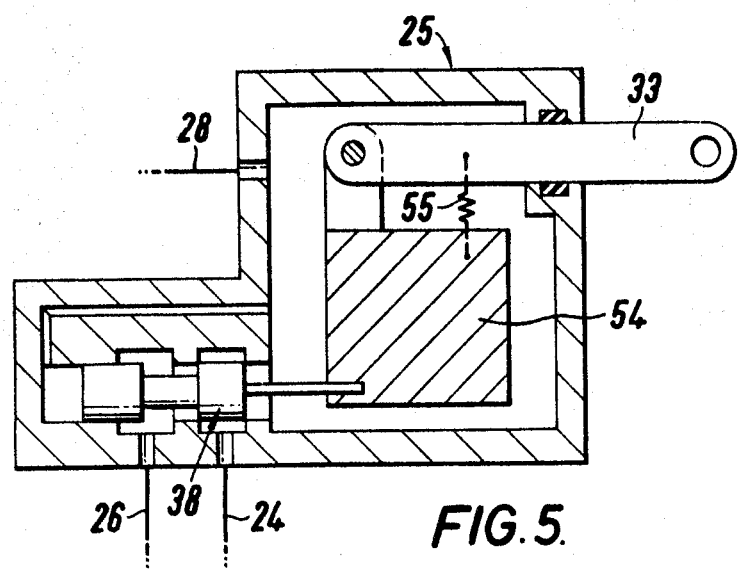
FIG. 5 is a sectional elevation of a third form of control unit.

Since, with the arrangement of FIG. 4, the valve is not continuously operating under the action of road shocks, it is subject to a lesser degree of wear, making for a longer life, and the quantity of liquid under pressure which is used is reduced. Separate damping means are then required to control the changes of wheel-to-body position due to road shocks. FIG. 5 shows another form of control unit 25 in which a weight 54 suspended on the sliding component 33 is connected at a point lower than its centre of mass to the valve spool 38 as in FIG. 3, but the weight 54, instead of being suspended freely so that its centre of mass tends to lie vertically below the suspension point, is biassed by a tension spring 55 coupled between it and the sliding component 33 to a position in which the movement exerted by its mass about the pivot point just balances the load in the spring. The arrangement of FIG. 5 operates in all respects in the same manner as the arrangement of FIG. 3. When a suspended weight as shown in FIG. 5 is used, the linkage component which connects it to the valve spool may be attached to it at its centre of mass as described with reference to FIG. 4. Damping means of any suitable form may be provided to damp the swinging movements of the suspended weight.

Each of the struts 18 may be provided with a separate source of liquid pressure, but it is preferred to connect all of the said struts, through their respective control units, to a common source of liquid pressure and low pressure reservoir.

Figure 6:
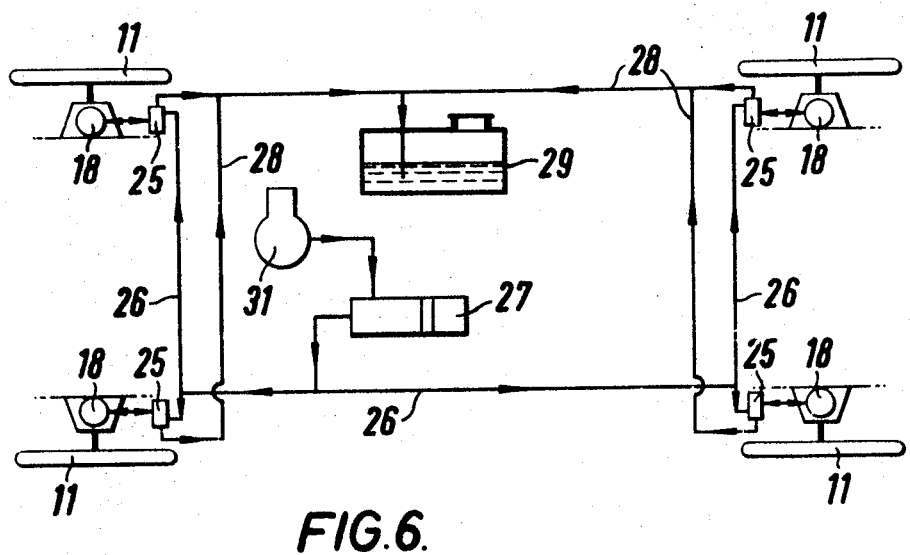
FIG. 6 is a diagram showing one arrangement of a suspension system providing independent suspension of all four wheels of a four-wheeled vehicle and embodying the invention.

FIG. 6 shows diagrammatically one convenient arrangement of the suspension system for a four wheeled vehicle having independent suspension for all four wheels. Each wheel 11 is attached to the vehicle body by a linkage system, not shown, and supports the vehicle through a strut 18 having an associated control unit 25. All of the control units 25 are connected by conduits 26 to a common liquid pressure accumulator 27 in which pressure is maintained by a pump 31, and all of the said control units 25 are also connected by conduits 28 to a common low pressure reservoir 29 from which the pump 31 draws liquid.

Figure 7:
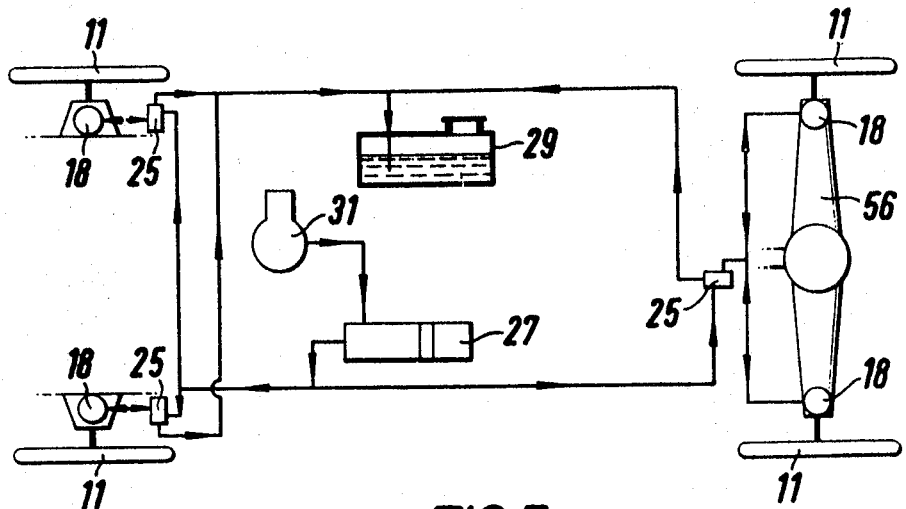
FIG. 7 is a diagram, similar to FIG. 6 showing a suspension system embodying the invention for a vehicle having a live rear axle.

In the case of a vehicle having the rear wheels mounted on a live rear axle 56, as shown in FIG. 7, two struts 18 each supporting the vehicle at one end of the said axle 56 may be connected to a common control unit 25 so that they act in unison. The control unit 25 associated with the struts 18 on the rear axle is so arranged that its sliding component 33 moves longitudinally of the vehicle and its suspended weight is pivoted about an axis transverse to the length of the vehicle, a linkage connected between the rear axle and the vehicle body being arranged to move the sliding component in the desired direction. This control unit is not therefore sensitive to body roll, but the swinging of the suspended weight assists in controlling longitudinal tilting of the vehicle due to weight transfer resulting from braking or acceleration.

It will be readily apparent also that one or more of the control units 25, as referred to in FIGS. 6 and 7, may be angularly disposed with respect to the longitudinal axis of the vehicle so that the suspended weight therein will be subjected to horizontal forces acting longitudinally of the vehicle as in the case of braking or acceleration as well as the centrifugal forces experienced during cornering.

I claim:

1. A vehicle suspension system including a vehicle body member with resilient means connected thereto and a fluid containing adjustable telescopic strut member connected in series with said resilient means, a wheel supporting member, and a wheel supported by said supporting member, linkage means operatively connected to said wheel supporting member and said vehicle body member and strut member to vary its overall length to enable the vehicle body member and its attitude to be constantly controlled with respect to the supporting surface with which the wheel engages, said control unit including a valve member movable in one direction to connect said strut member with a source of fluid pressure and movable in the opposite direction to connect said strut member with a drain, a first link member operatively connected to said wheel support member and to a weight and movable by relative wheel-to-body movement, said weight being pivotally suspended from said first link member and a second link member connected at one end to said valve member and for actuation of said valve member, the opposite end of said second link member being pivotally connected to said weight at a point below said weight, whereby said weight tends to maintain a constant position relative to said first link member and causes said second link member to follow the movement of said first link member to activate said valve member to connect said strut member with a source of fluid pressure or the drain to vary the fluid content of the strut member to control the vehicle body attitude.

2. The system of a control unit according to claim 1 wherein said second link member is connected to the suspended weight at a point lower than the center of mass of said weight.

3. The system of claim 1, wherein the second link member is connected to the suspended weight at the center of mass of said weight.

4. The system of claim 1 wherein the suspended weight is acted on by a spring acting to exert a force about the pivot point of the weight, so that said weight tends to take up a position in which the gravitational forces acting thereon are counterbalanced by said spring.

References Cited
UNITED STATES PATENTS 2,650,108    8/1953    Bruce _____ 280—124.1

PHILIP GOODMAN, Primary Examiner

U.S. Cl. X.R.

280—124; 267—34